United States Patent
Williams

(10) Patent No.: US 11,167,931 B1
(45) Date of Patent: Nov. 9, 2021

(54) SCREW CONVEYOR WITH LOWER THRUST BEARING

(71) Applicant: Zima Corporation, Spartanburg, SC (US)

(72) Inventor: Benjamin M. Williams, Simpsonville, SC (US)

(73) Assignee: Zima Corporation, Spartanburg, SC (US)

( * ) Notice: Subject to any disclaimer, the term of this patent is extended or adjusted under 35 U.S.C. 154(b) by 0 days.

(21) Appl. No.: 17/064,662

(22) Filed: Oct. 7, 2020

Related U.S. Application Data

(60) Provisional application No. 62/911,405, filed on Oct. 7, 2019.

(51) Int. Cl.
| | |
|---|---|
| *B65G 33/32* | (2006.01) |
| *B65G 33/14* | (2006.01) |
| *B65G 33/26* | (2006.01) |
| *F16C 33/10* | (2006.01) |
| *F16C 17/12* | (2006.01) |

(52) U.S. Cl.
CPC .......... *B65G 33/32* (2013.01); *B65G 33/14* (2013.01); *F16C 17/12* (2013.01); *F16C 33/106* (2013.01); *B65G 33/265* (2013.01)

(58) Field of Classification Search
None
See application file for complete search history.

(56) References Cited

U.S. PATENT DOCUMENTS

| | | | |
|---|---|---|---|
| 3,581,916 A | 6/1971 | Brumagim | |
| 3,867,057 A * | 2/1975 | Grujanac | F04B 19/12 415/72 |
| 5,150,972 A | 9/1992 | Wenzel | |
| 6,206,177 B1 * | 3/2001 | Broten | B65G 33/32 198/672 |
| 6,468,029 B2 | 10/2002 | Teplanszky | |
| 8,181,720 B2 | 5/2012 | Prill et al. | |
| 8,376,616 B2 | 2/2013 | Pheasey | |
| 9,850,709 B2 | 12/2017 | Ficken | |
| 2010/0326730 A1 | 12/2010 | Prill et al. | |

* cited by examiner

*Primary Examiner* — Kavel Singh
(74) *Attorney, Agent, or Firm* — Timothy J. Monahan; Monahan & Company, LLC

(57) ABSTRACT

A screw conveyor is provided for lifting a sludge from a collection point. The conveyor includes a lower bearing assembly having a post with a thrust bearing attached to the top, which can be inserted in a socket in the shaft component of the screw. The base of the post is attached to a plate, and the plate can be bolted to the intake end of the tube component of the conveyor. The inner bearing assembly and the intake end of the shaft of the screw are contained within the interior of the tube, such that a seal between the shaft and the plate, which serves as an end cap of the tube, is not required. In an alternative embodiment of the invention, the relative positions of the post and socket can be reversed, with the socket attached to the plate to the intake end of the tube, and the post attached to the shaft component of the screw.

20 Claims, 7 Drawing Sheets

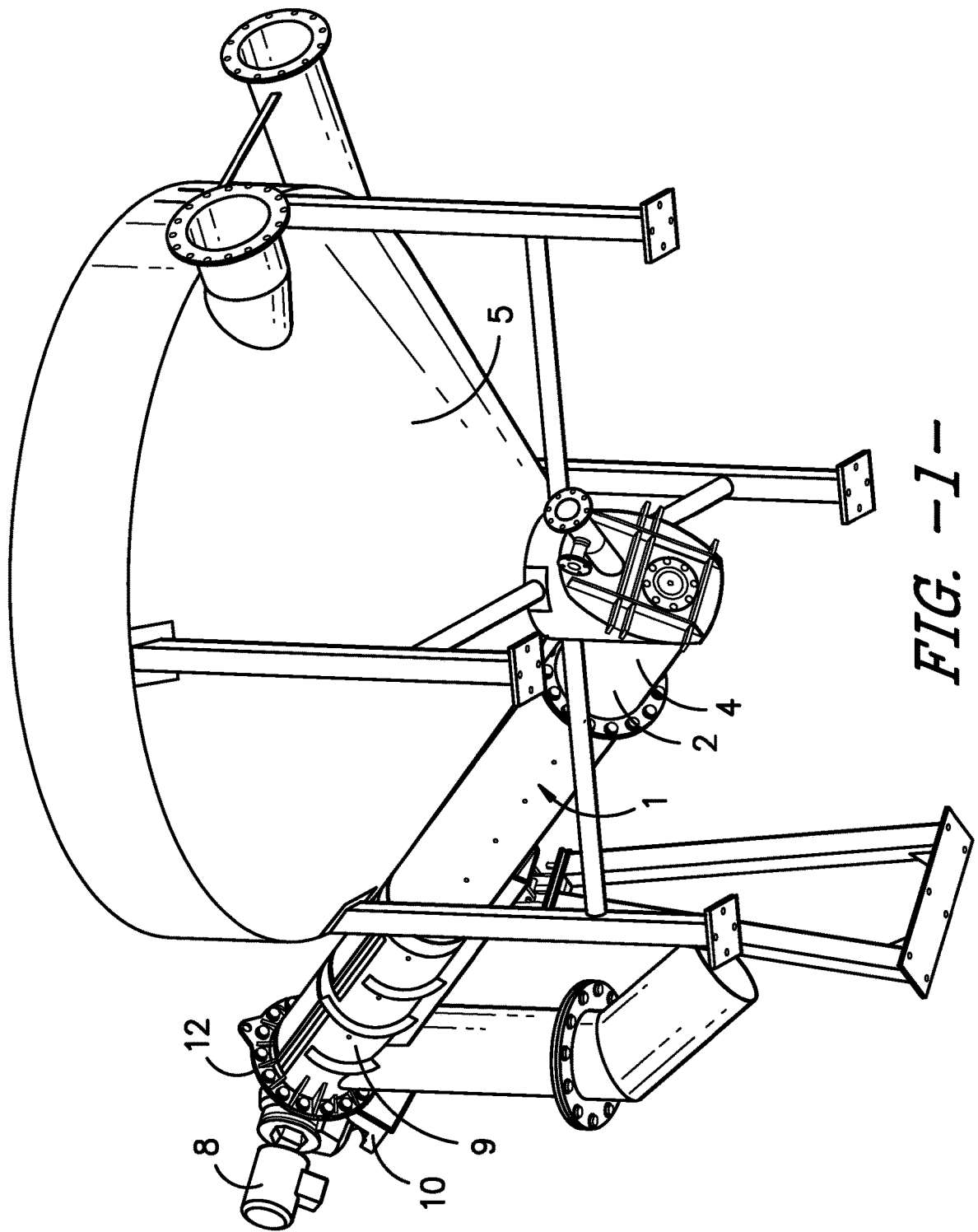
FIG. -1-

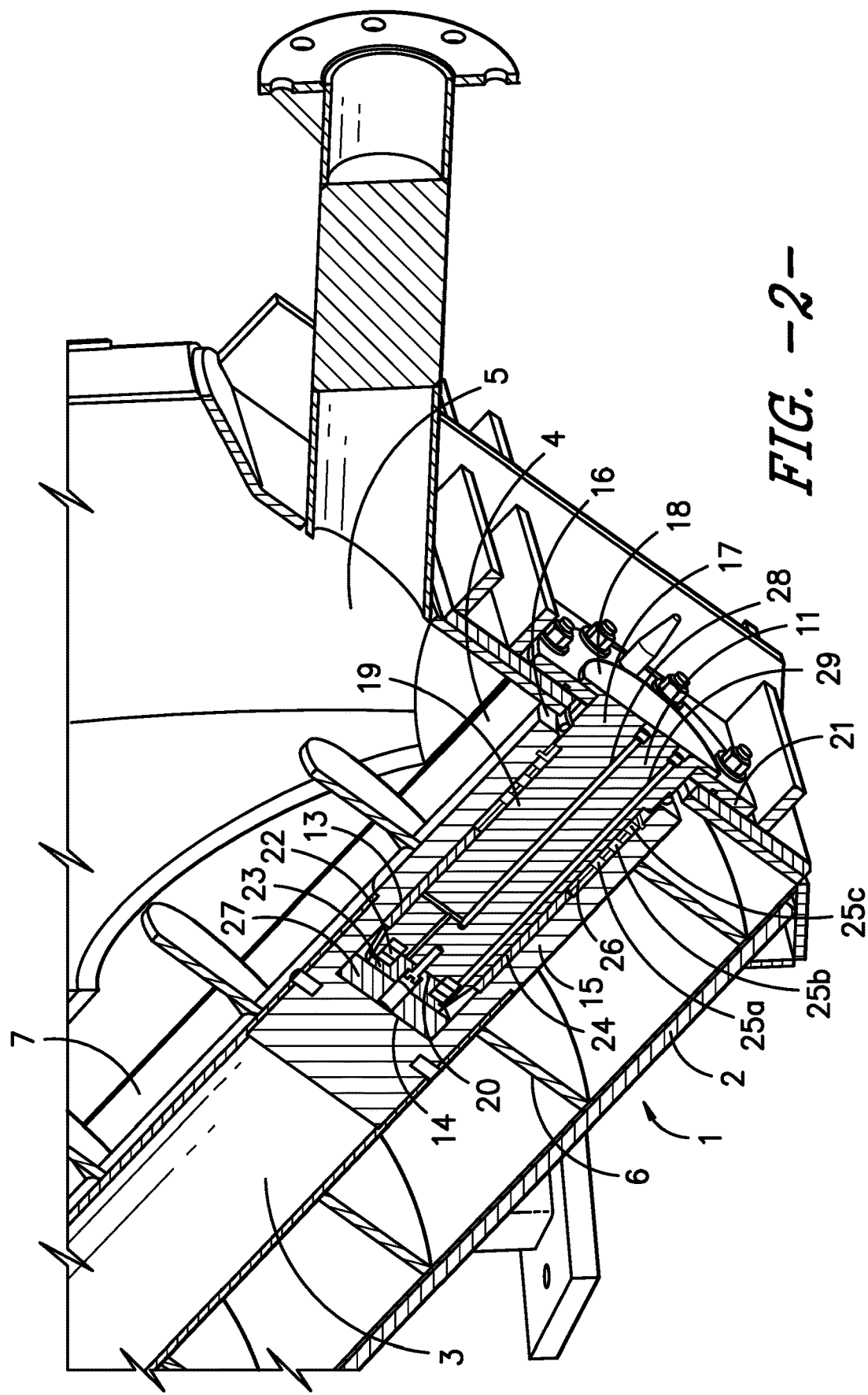
FIG. -2-

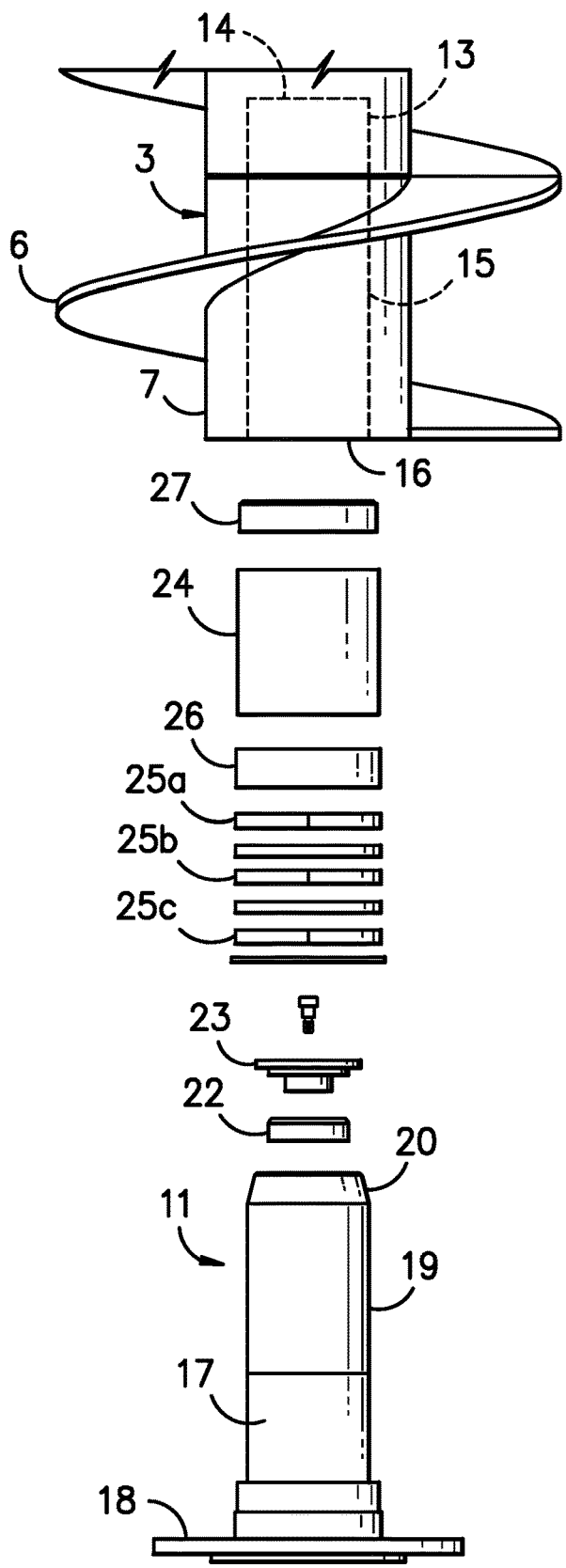
FIG. -3-

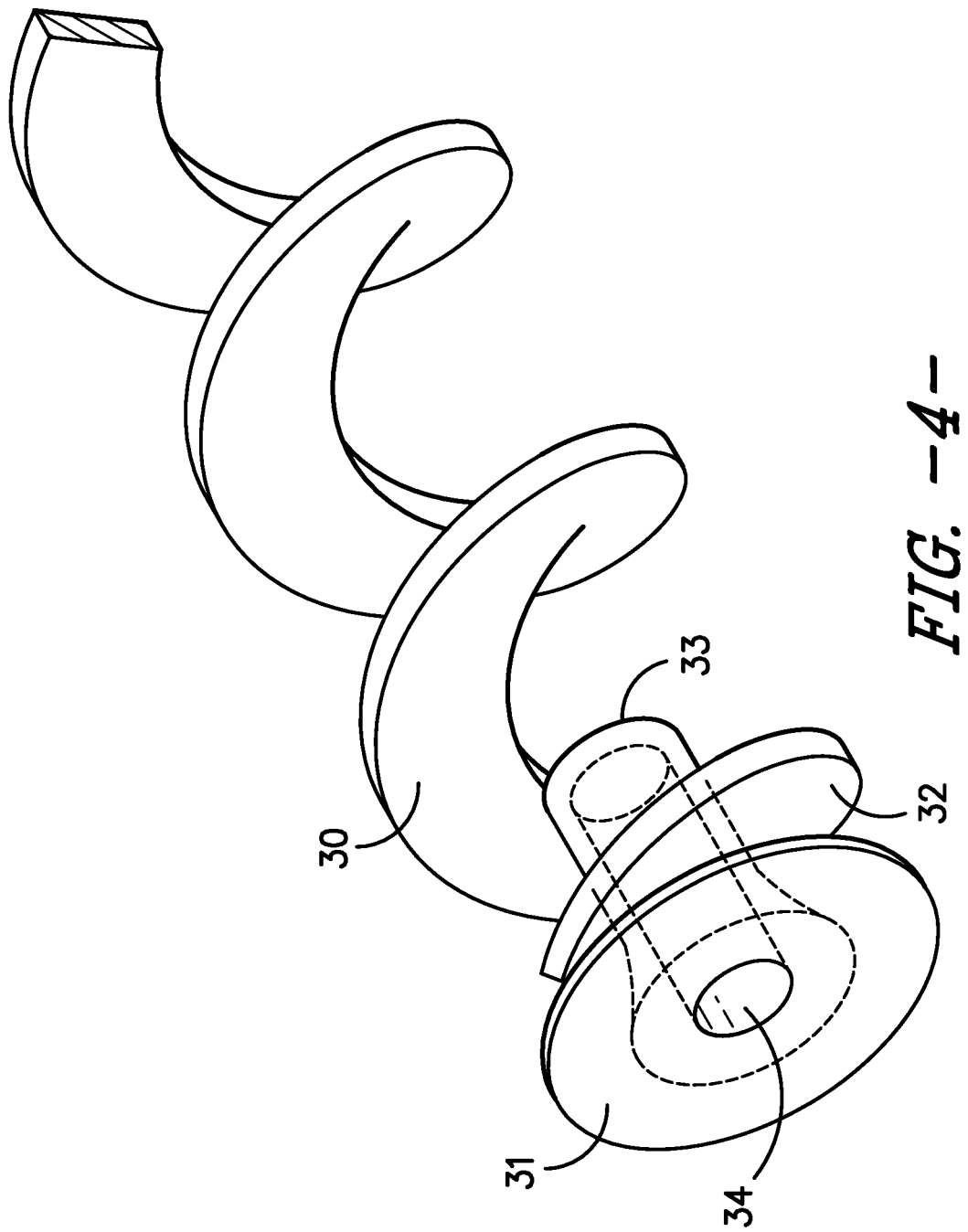

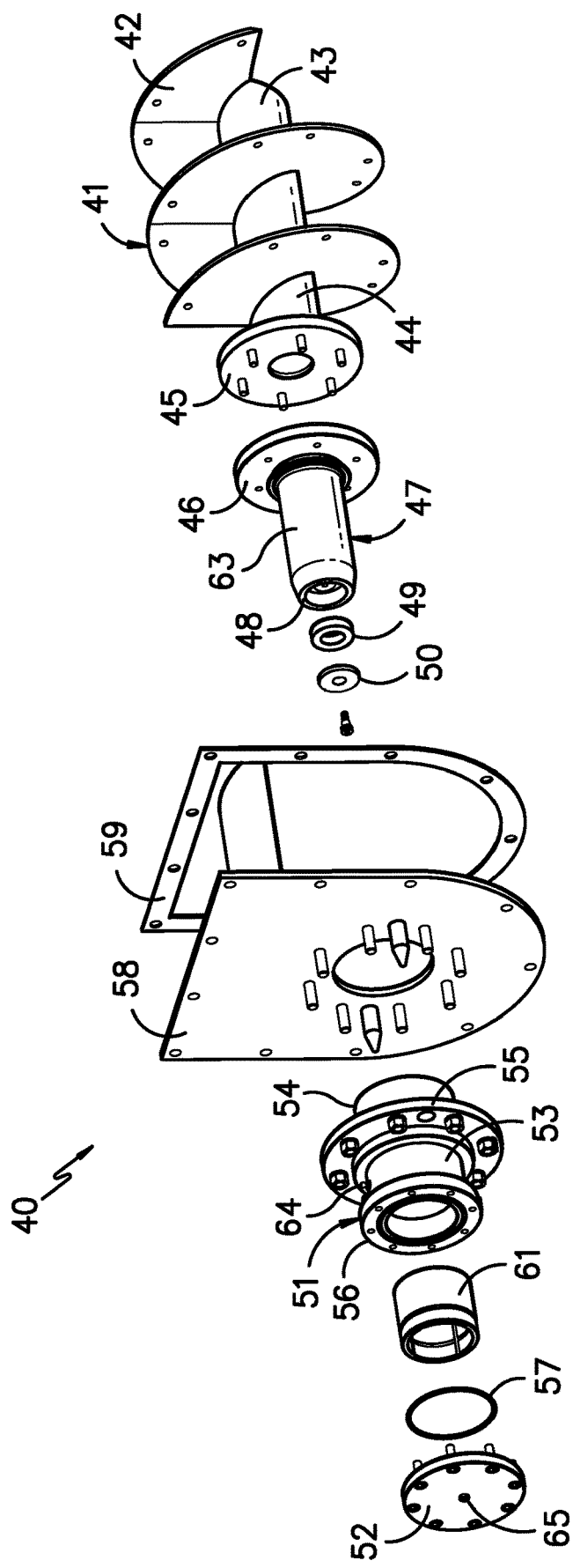
FIG. -5-

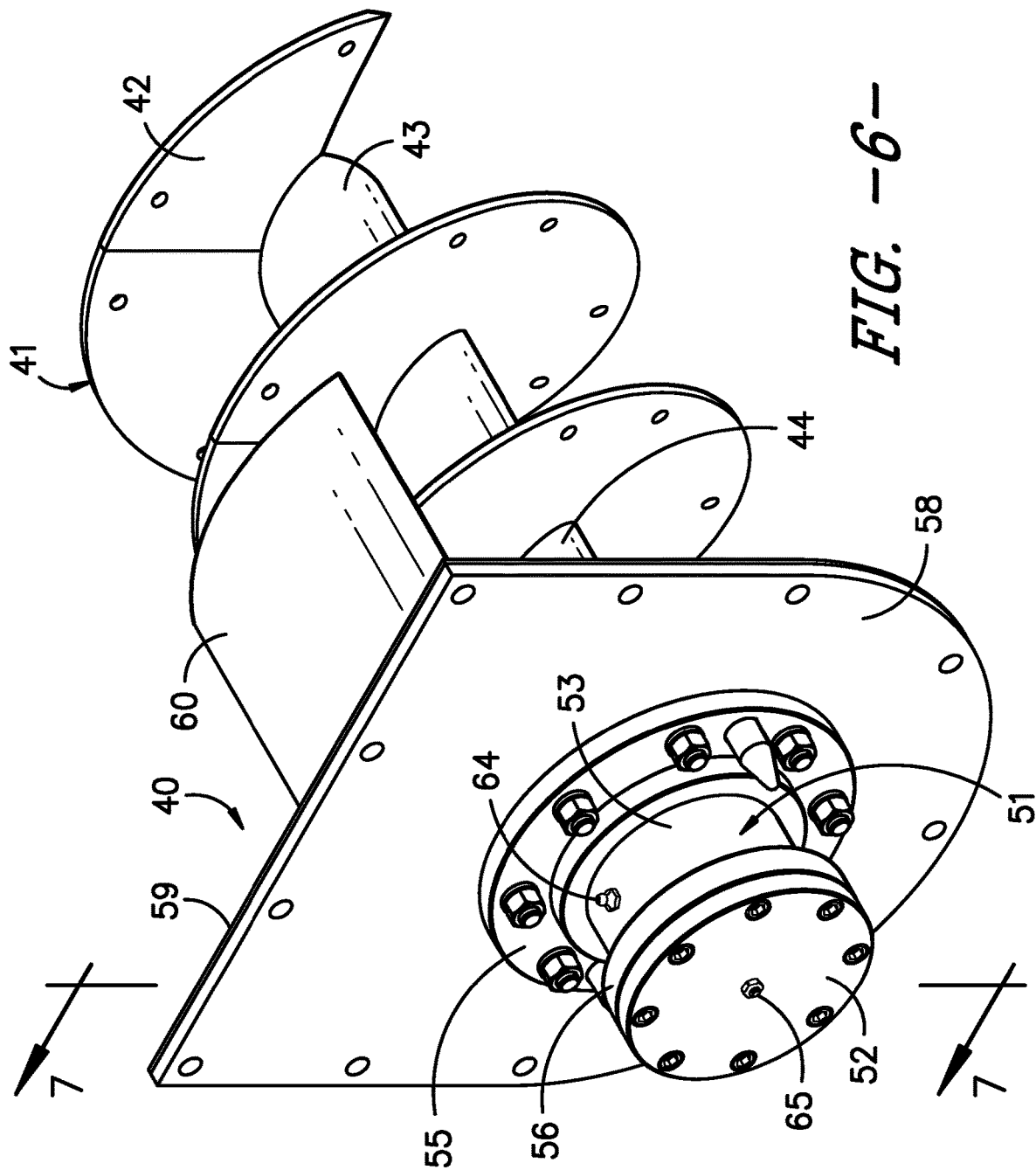
FIG. -6-

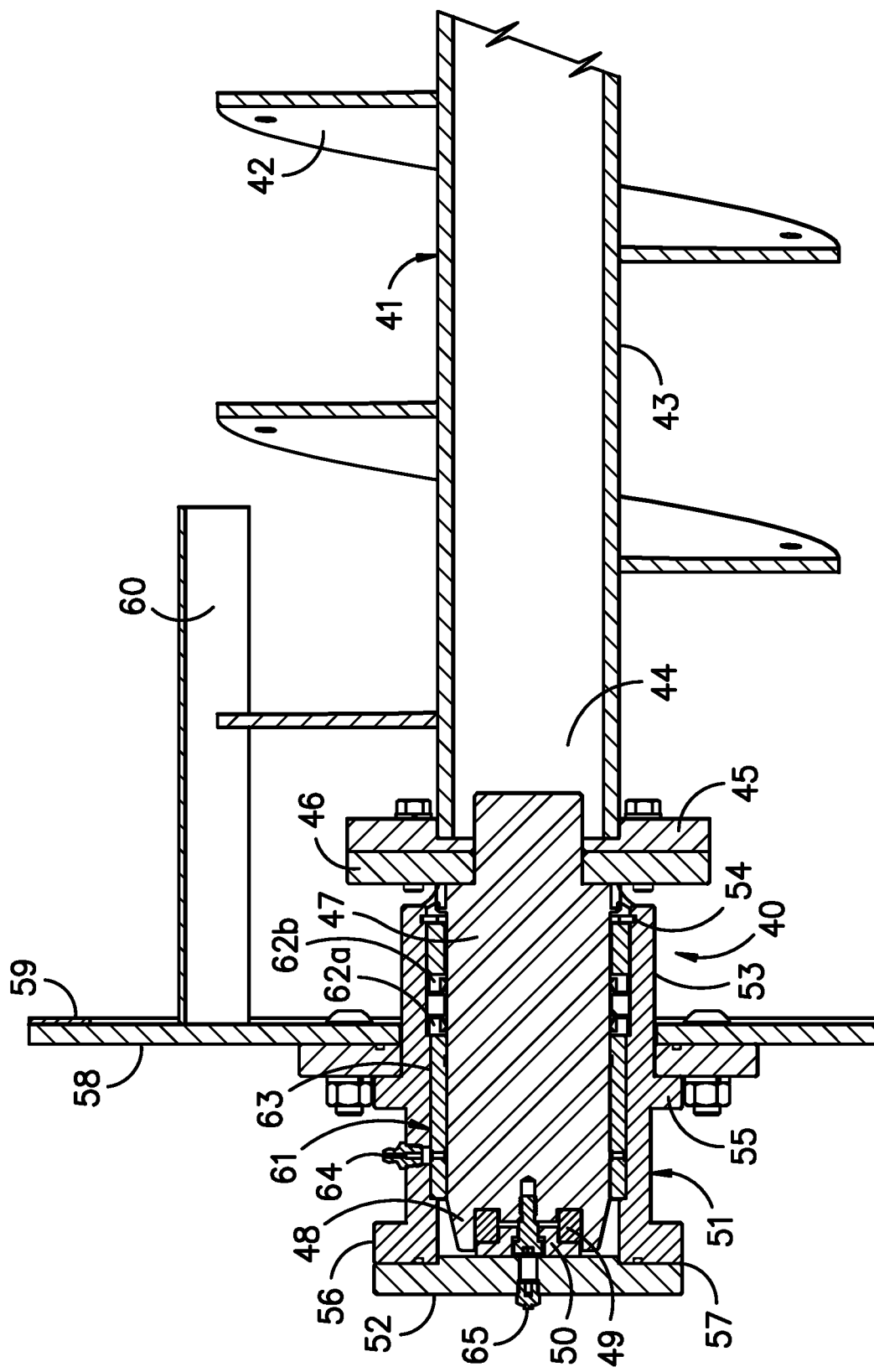
FIG. -7-

SCREW CONVEYOR WITH LOWER THRUST BEARING

This invention relates generally to a screw conveyor for transporting solids or mixtures of solids and liquids, such as a sludge. The conveyor has a lower bearing assembly incorporating a thrust bearing.

BACKGROUND OF THE INVENTION

Many industrial processes require that solids or mixtures of solid and liquid materials be transported from one location to another. For example, wastewater treatment facilities typically generate a sludge material, which may be recycled in the system or isolated for further processing, such as dewatering and disposal. Screw conveyors are often employed to transport such material.

Grujanac et al.—U.S. Pat. No. 3,867,057 disclose a screw pump with a lower bearing assembly having a positive pressure lubrication system. The upper bearing assembly 20 incorporates dual bearings for both axial and radial thrust loads. The lower bearing assembly 30 incorporates a grease-lubricated sleeve bearing designed to absorb radial forces. During operation of the screw pump, lubricant is automatically fed to the lower bearing assembly under pressure.

SUMMARY OF THE INVENTION

A screw conveyor is provided having an elongated tube with a screw mounted inside the tube, and the screw can be rotated relative to the tube, for example by a motor coupled to the screw. The tube has an intake end and a discharge end. A plate may be attached to the intake end of the tube to seal it. The plate may be aligned perpendicular to the longitudinal extent of the tube. The screw has an intake end and a discharge end, opposite the intake end. With the intake end of the screw adjacent the intake end of the tube.

The tube and screw can be oriented at any angle from vertical to horizontal, or can even be oriented to move materials downhill. By way of example, the tube and screw can be oriented between an angle of from 0° to 90° upward or from 0° to 90° downward, measured from the intake to the discharge end.

The screw may comprise a helical flight mounted on an axle. Alternatively, the screw may be shaftless, with a helical ribbon of material supported on a mandrel provided at one or both ends of the screw.

An upper bearing assembly may be coupled to the screw, to support the screw and to maintain the orientation of the discharge end of the screw relative to the tube. The upper bearing assembly may comprise bearings for radial load. Optionally, the upper bearing assembly may also include bearings for thrust loads. A drive mechanism, such as a geared motor with a flexible coupling, chain, gears, etc., may be connected to the discharge end of the screw. For example, the drive mechanism may be coupled adjacent to the discharge end of the screw, with the upper bearing assembly positioned between the drive mechanism and the screw. Alternatively, the screw may be supported by the tube itself, a mid-shaft bearing, or other mechanism known to those skilled in the art. Additionally, the drive mechanism may be positioned to engage the screw at a location other than the discharge end of the screw.

The screw conveyor has a shaft at the intake end of the screw. The shaft may be the lower end of the axle or extension thereof, in the case of a screw comprised of a helical flight mounted on the axle. Alternatively, the shaft may be part of a mandrel affixed to the intake end of a shaftless screw, and aligned with the axis of rotation of the screw.

A lower bearing assembly is provided with (i) a socket having an interior back wall, a side wall extending out from the back wall, and an opening opposite the back wall; (ii) a post having a base, an exterior side wall extending out from the base, and a head opposite the base, wherein the post is seated in the socket with the head of the post adjacent the back wall of the socket; and (iii) a thrust bearing positioned between the head of the post and the back wall of the socket. The thrust bearing may be mounted on the head of the post. The thrust bearing reduces the friction between the socket and post, while supporting an axial load, that is, relative to the axis of rotation of the screw.

The interior side wall of the socket is characterized by a circular cross section, perpendicular to the longitudinal extend of the socket. The width of the socket need not be uniform as the side wall extends from the back wall to the opening. For example, the interior of the side wall may be cylindrical, or the side wall may be conical, that is, tapering gradually inward from the opening to the back wall, or the side wall may narrow inward in increments or steps from the opening to the back wall. Features may be provided in the side wall of the socket, such as annular grooves for lubrication to circulate and mechanical interfacing for seals and retainer rings.

The profile of the exterior side wall of the post corresponds to the profile of the interior side wall of the socket. Accordingly, the exterior side wall of the post has a circular cross section perpendicular to the longitudinal extend of the post. As with the socket, the exterior side wall of the post may be cylindrical, conical or tapered in increments or steps.

The position of the socket and post, relative to the shaft of the screw, may take the form of two different embodiments. In a first embodiment, the socket is incorporated into the shaft at the intake end of the screw, with the opening of the socket facing away from the discharge end of the screw, and the base of the post is attached to the plate at the intake end of the tube, with the head of the post facing inward and inserted in the socket. In a second embodiment, the base of the post is attached to the shaft at the intake end of the screw, with the head of the post facing away from the discharge end of the screw, and the socket is attached to the plate at the intake end of the tube, with the opening facing inward and the socket surrounding the head of the post. The post, socket and shaft are coaxially aligned, relative to the axis of rotation of the screw.

In the second embodiment described above, the socket may be attached to the plate at the intake end of the tube with the interior back wall of the socket within the tube. Alternatively, the exterior wall of the socket may be attached to the plate, with the opening of the socket within the interior of the tube and the back wall of the socket on the exterior of the tube, that is, with the end of the socket opposite the opening extending outward from the plate. An advantage of partially exposing the exterior side wall of the socket is that access is provided to the socket at two different places along the length of the socket, that is, longitudinally spaced apart, for introducing and discharging a lubricant for the lower bearing assembly. For example, one access point may be through the back wall of the socket and another access point may be the side wall of the socket, which promotes the circulation of lubricant throughout the lower bearing assembly.

A radial bearing may be incorporated in the lower bearing assembly, positioned between the exterior side of the post and the interior side wall of the socket. The radial bearing may be a sleeve bearing, as is known in the art. Additionally, an annular seal may be provided, positioned between the exterior side of the post and the interior side wall of the socket. The annular seal is on an opposite side of the radial bearing from the head of the post and thrust bearing, thereby preventing the material being conveyed from contacting the thrust bearing and radial bearing, as well of the portions of the post and socket adjacent to the bearings. The annular seal also defines a space within the lower bearing assembly in which a lubricant may be circulated to reduce bearing friction. The radial bearing and annular seal may be mated to the mount shaft, whereby they are stationary relative to the mount shaft during operation of the screw conveyor. Multiple annular seals may be provided to further minimize the introduction of abrasive material into the lower bearing assembly.

An advantage of the present invention is that the lower bearing assembly may be partially submerged or completely submerged in the material being conveyed. In particular, in both the first and second embodiments of the invention, the opening in the socket is positioned within the interior of the tube and is submersible in the material being conveyed. As a consequence, the intake end of the shaft can be supported, without the shaft or an extension thereof extending outside of the tube, such as through the plate enclosing the intake end of the tube, thereby obviating the need for a seal between the inside and outside of the tube. The bearings in the lower bearing assembly, especially the thrust bearings, which would otherwise be exposed to abrasive particles, corrosive agents, and other harsh components found in materials such as sludge generated from wastewater treatment, and which could otherwise shorten the life of the bearings, are protected by the annular seals and the ability to create positive lubricant pressure with the lower bearing assembly during operation.

Another advantage of the invention is that the lower bearing assembly can be easily serviced to replace the thrust bearing and/or radial bearing. For example, in the first embodiment, removing the plate attached to the intake end of the tube allows the post to be removed. Alternatively, in the second embodiment, the plate supporting the socket can be removed, to expose the post and service the bearings. The lower bearing assembly can be serviced while the screw rests in the tube. The intake end of the screw can be re-centered when the lower bearing assembly is reinstalled.

Still another advantage of the invention is that the lower bearing assembly is able to replace a conventional, flanged thrust bearing or flange-mounted thrust bearing, which results in significantly higher load bearing capacity for a given size and less capital expense.

Yet another advantage of the present invention is that the conveyor may be oriented in an upright position, for example, at an angle of from 30° to 90° relative to horizontal, and the load created by the weight of the screw and the force required to move the material, can be handled by the thrust bearing in the lower bearing assembly.

BRIEF DESCRIPTION OF THE DRAWINGS

FIG. 1 is a lower, perspective view of the screw conveyor being used in conjunction with a settling tank.

FIG. 2 is a side, sectional view of the intake end of the screw conveyor and lower bearing assembly.

FIG. 3 is a side, exploded view of the lower bearing assembly and the shaft component of the screw.

FIG. 4 is shaftless screw, in which the shaft affixed to the intake end of the screw is part of a mandrel affixed to the screw.

FIG. 5 is an exploded view of an embodiment of the lower bearing assembly and supporting structures.

FIG. 6 is a perspective view of the lower bearing assembly illustrated in FIG. 5, as assembled.

FIG. 7 is a sectional view of the lower bearing assembly illustrated in FIG. 6.

DETAILED DESCRIPTION OF THE INVENTION

Without intending to limit the scope of the invention, the preferred embodiments and features are hereinafter set forth. All of the United States patents and published patent applications cited in the specification are incorporated herein by reference.

Referring to FIGS. 1 and 2, screw conveyor 1 has tube 2 and screw 3. Intake end 4 of screw conveyor 1 receives a sludge comprising a mixture of solids and liquid material, which is gravity fed from settler 5. Screw 3 has flight 6 helically wrapped around shaft 7. Screw 3 is rotated by motor assembly 8 positioned at the discharge end 9 of screw conveyor 1. Motor assembly 8 may include both a motor and a transmission or gear box for transferring rotational force to screw 3. Screw 3 is supported adjacent discharge end 9 by upper bearing assembly 10 and at intake end 4 by lower bearing assembly 11.

While the invention is described in the context of a sludge being fed by gravity from a settling tank, the screw conveyor of the present invention may be used for other applications. For example, the material fed to the screw conveyor may be a dry, free-flowing particulate, granular material or aggregate, such as grain, food products and bulk polymers, instead of a mixture of solids and liquids. The present invention may also be employed to convey a liquid that is substantially free of solids. Instead of feeding the material by gravity to intake 4 of screw conveyor 1, the material may be fed by a screw feeder or other metering device. The term "conveyor" is intended to include both conventional conveyors, which may run from 10% to 50% of full volume, and screw feeders, which may run at full volume and are designed to meter the flow of material.

The present invention is useful in conjunction with a wide variety of screws used to convey material, including (i) standard pitch screws; (ii) variable pitch screws; (iii) double flight screws; (iv) tapered flight screws; (v) ribbon flight screws; and (vi) screws with paddles, cut flights, and folded flights. The term "screw" is intended to include augers and similar conveyances for employing rotational energy to linearly convey material. Furthermore, while the screw conveyor is described with respect to a cylindrical tube enveloping the screw, the term "tube" is also intended to include troughs having a lower half conforming to the outer diameter of the flight of the screw and an upper half that is accessible, such as being covered with a removable inspection lid, open flume or other geometry compatible with a screw conveyor.

Upper bearing assembly 10 contains a radial bearing, which supports the discharge end of screw 3, allowing it to turn relative to tube 2. Optionally, upper bearing assembly 10 may also include a thrust bearing, such as a flanged thrust bearing, to counteract the weight of the screw and the force required to lift the material being conveyed against gravity. Upper bearing assembly 10 may be positioned between motor assembly 8 and the upper end cap 12 of tube 2.

Referring to FIGS. 2 and 3, lower bearing assembly 11 is positioned adjacent the intake end 4 of screw conveyor 1. Socket 13 is incorporated into shaft 7 at the intake end of screw 3. Socket 13 has interior back wall 14, side wall 15 and opening 16, opposite back wall 14. Lower bearing assembly 11 includes post 17 having base 18, side wall 19 and head 20. Base 18 is attached to plate 21, for example, by welding. Plate 21, in turn, may be attached to the intake end 4 of tube 2, for example, by a series of bolts, to allow lower bearing assembly 11 to be easily serviced. A gasket may be provided between plate 21 and tube 2, as is known in the art. Head 20 of post 17 extends through opening 16 of socket 13, adjacent the interior of back wall 14.

Thrust bearing 22 is positioned between head 20 of post 17 and back wall 14 of socket 13. In the embodiment illustrated, thrust bearing 22 is mounted on head 20, and includes bearing cap 23, which secures thrust bearing 22 in place, while allowing it to rotate. Lower bearing assembly 11 is inserted into socket 13 of shaft 7, with thrust bearing 22 abutting the back wall 14, or abutting a protective spacer incorporated between the thrust bearing and the back wall. By way of example, the thrust bearings used in the present invention may be thrust ball bearings, cylindrical roller thrust bearings, tapered roller thrust bearings, spherical roller thrust bearings, needle roller thrust bearings, or fluid film thrust bearings.

Radial bearing 24, in particular, a bronze, sleeve bushing, is positioned on post 17, below thrust bearing 22. Annular seals 25a, 25b and 25c are positioned on post 17 below radial bearing 22, and the seals function to prevent the bearing from being exposed to the material being conveyed. Spacer 26 may be supported on post 17, between radial bearing 22 and seals 25a-c, which serves to isolate the seals from the bearings. Lower bearing assembly 11 may include spacer 27, positioned between thrust bearing 22 and back wall 14 of socket 13.

Lubrication for thrust bearing 22 and radial bearing 24 is circulated through intake passageway 28 and discharge passageway 29. The lubricant can be maintained under positive pressure to resist the seepage of material past seals 25a-c, while the screw conveyor is operating or while it is not in service. Similarly, the lubricant can be flushed while the screw conveyor is operating or while it is not in service. The precise path of the lubricant into the space or gap between socket 13 and post 17 is not critical, provided the lubricant reaches thrust bearing 22. For example, the flow of lubricant from intake passageway 28 to discharge passageway 29 may be reversed. In a broader concept, the lubrication system may be characterized as having a passageway or other channel to supply an input of lubricant into socket 13, at a point between back wall 14 and annular sleeves 25a-c to reach thrust bearing 22, and a passageway or channel for the lubricant to get back out, for the purpose of introducing clean lubricant to the bearing and bushing and purging existing lubricant. The lower bearing assembly 11 may be provided with suitable fittings or check valves, to limit the flow of lubricant to one direction.

In the embodiment illustrated in FIGS. 1-3, lower bearing assembly 11, in particular, socket 13, post 17 and thrust bearing 22, are all positioned within tube 2. An advantage of the present invention, is shaft 7 of screw 3 does not protrude from tube 4, in particular, not from plate 21, thereby obviating the need for another seal.

The ease with which lower bearing assembly 11 can be serviced is apparent from FIGS. 1 and 2. By removing the bolts attaching plate 21 to intake end 4 of tube 2, post 17 of lower bearing assembly 11 can be slid out of socket 13, and screw 3 can be allowed to rest against the inside of tube 2. After lower bearing assembly 11 is serviced, it can be slid into socket 13, screw 3 can be re-centered in tube 2, and plate 21 can be re-bolted to tube 2.

Also included in the scope of the invention are shaftless screws, as illustrated in FIG. 4. Screw 30 has mandrel 31 attached to its intake end 32. Mandrel 31 incorporates shaft 33, which is provided with socket 34. Lower bearing assembly 11 (not shown) can be inserted into socket 34, as shown and described with respect to screw conveyor 1 in FIGS. 1-3.

FIGS. 5-7 illustrate an alternative embodiment of the invention. FIG. 5 shows an exploded view of lower bearing assembly 40. Screw 41 has helical flights 42 wound around shaft 43. Lower end 44 of screw 41 has flange 45 with studs arranged to engage base 46 of post 47. At the opposite end from base 46, post 47 has head 48. Thrust bearing 49 is attached to head 48 by bearing cap 50, whereby thrust bearing 48 is allowed to rotate. Socket 51 has back wall 52, side wall 53 and opening 54. Socket 51 is provided with a center flange 55 positioned between back wall 52 and opening 54. For example, center flange 55 may be approximately midway down the length of side wall 53. Socket 51 also has end flange 56 and gasket 57, for temporarily attaching back wall 52, whereby back wall 52 is can be removed for servicing lower bearing assembly 40.

Plate 58 can be attached to the intake end of the tube (not shown) and sealed with gasket 59. Plate 58 is provided with studs, which allow socket 51 to be attached, for example, bolted on using center flange 55. Plate 55 is provided with internal deflector 60, for removing and distributing accumulation the material being conveyed. It can be understood that plate 58 may be conveniently removed for servicing lower bearing assembly 40, as needed.

Lower bearing assembly 40 has radial bearing 61 and annular seals 62a and 62b, which function as described above, with respect to the first embodiment of the invention. Post 47 is inserted into socket 51, whereby thrust bearing 49 is abutting the interior side of back wall 52 and the exterior side wall 63 of post 47 engages radial bearing 61 and annular seals 62a-b.

Socket 51 is provided with fitting 64 for introducing lubricant into the space between the interior of socket 51 and post 47, whereby the lubricant can reach thrust bearing 49 and radial bearing 61. The lubricant can be discharged out of fitting 65 located in back wall 52 of socket 51. It can be understood that the flow of lubricant through the lower bearing assembly can be reversed, by providing suitable one-way fittings. An advantage of the arrangement of the side fitting and back wall fittings 64 and 65, respectively, is that the lubricant can be forced to circulate through the interior of the lower bearing assembly 40 and reach both thrust bearing 49 and radial bearing 61.

FIG. 6 illustrates the assembled parts shown in FIG. 5. FIG. 7 is a cross sectional view of lower bearing assembly 40 and the related components of the screw conveyor, taken along section line 7-7 of FIG. 6.

There are, of course, many alternative embodiments and modifications of the invention, which are intended to be included in the following claims.

What I claim is:

1. A screw conveyor for a solid or mixed solid and liquid material, comprising:
   (a) a tube having an intake end, a plate attached to the intake end, and a discharge end;
   (b) a screw having a shaft, an intake end, and a discharge end, wherein the screw is mounted in and is rotatable relative to the tube;

(c) a drive mechanism coupled to the screw;

(d) a lower bearing assembly, comprising (i) a socket having an interior back wall, a side wall extending outward from the back wall, the side wall having an interior characterized by a circular cross section, and an opening opposite the back wall; (ii) a post having a base, an exterior side wall having a circular cross section corresponding to the inner wall of the socket and extending outward from the base, and a head opposite the base, wherein the post extends through the opening in the socket and is seated in the socket with the head of the post adjacent the back wall of the socket; (iii) a thrust bearing positioned between the head of the post and the back wall of the socket, and (e) wherein either (i) the socket is incorporated into the shaft at the intake end of the screw, and the base of the post is attached to the plate at the intake end of the tube; or (ii) the base of the post is attached to the shaft at the intake end of the screw, and the socket is attached to the plate at the intake end of the tube.

2. The conveyor of claim 1, wherein the lower bearing assembly further comprises a radial bearing positioned between the exterior side of the post and the interior side wall of the socket, and an annular seal positioned between the exterior side of the post and the interior side wall of the socket, wherein the annular seal is on an opposite side of the radial bearing from the head of the post.

3. The conveyor of claim 2, wherein the lower bearing assembly further comprises (i) a fitting for a lubricant, wherein the fitting is accessible from an outside of the tube; (ii) a first passageway from the fitting to a space between the post and the socket, wherein the space is between the back wall of the socket and the annular seal; and (iii) a second passageway from the space between the post and the socket to a discharge port in communication with the outside of the tube.

4. The conveyor of claim 2, wherein the socket is incorporated into the shaft at the intake end of the screw, and the base of the post is attached to the plate at the intake end of the tube.

5. The conveyor of claim 4, wherein the lower bearing assembly further comprises (i) a fitting for a lubricant, wherein the fitting is accessible from an outside of the tube; (ii) a first passageway from the fitting through the post to a space between the post and the socket, wherein the space is between the back wall of the socket and the annular seal, for introducing the lubricant; and (iii) a second passageway from the space between the post and the socket, through the post to a discharge port in communication with the outside of the tube.

6. The conveyor of claim 5, wherein the fitting and the discharge port are positioned in the plate at the intake end of the tube.

7. The conveyor of claim 3, wherein the base of the post is attached to the shaft at the intake end of the screw, and the socket is affixed to the plate at the intake end of the tube.

8. The conveyor of claim 7, wherein a portion of the side wall of the socket extends outward from an interior of the tube past the plate.

9. The conveyor of claim 8, wherein either the fitting or the discharge port is positioned in the portion of the side wall of the socket extending outward from the plate.

10. The conveyor of claim 2, wherein the radial bearing is a sleeve bushing.

11. The conveyor of claim 1, wherein the screw comprises helical flights mounted on the shaft, and the shaft extends the length of the screw.

12. The conveyor of claim 11, wherein the intake end of the screw does not extend past the plate attached to the intake end of the tube.

13. The conveyor of claim 1, wherein the material being conveyed is a mixed solid and liquid material, and the opening in the socket of the lower bearing assembly is submerged in the material being conveyed.

14. The conveyor of claim 1, wherein the lower bearing assembly is positioned within an interior of the tube.

15. The conveyor of claim 1, further comprising an upper bearing assembly coupled to and supporting the discharge end of the screw.

16. The conveyor of claim 2, further comprising an annular spacer positioned between the exterior side of the post and the interior side wall of the socket, and between the radial bearing and the annular seal.

17. The conveyor of claim 1, wherein the thrust bearing is attached to the head of the post.

18. The conveyor of claim 2, wherein the thrust bearing is attached to the head of the post.

19. The conveyor of claim 4, wherein the thrust bearing is attached to the head of the post.

20. The conveyor of claim 7, wherein the thrust bearing is attached to the head of the post.

* * * * *